United States Patent [19]

Molari, Jr.

[11] 4,322,476
[45] Mar. 30, 1982

[54] IMPACT RESISTANT LAMINATE

[75] Inventor: Richard E. Molari, Jr., Pittsfield, Mass.

[73] Assignee: General Electric Company, Pittsfield, Mass.

[21] Appl. No.: 102,775

[22] Filed: Dec. 12, 1979

[51] Int. Cl.³ .................. B32B 9/04; B32B 17/10; B32B 27/00
[52] U.S. Cl. .................. 428/412; 428/411; 428/413; 428/425; 428/429; 428/447; 428/480; 428/500; 428/424.4
[58] Field of Search ............ 428/412, 447, 448, 911, 428/409, 426, 428, 425, 413, 414, 411, 480, 500

[56] References Cited

U.S. PATENT DOCUMENTS

| | | |
|---|---|---|
| 3,396,075 | 8/1968 | Morris . |
| 3,520,768 | 7/1970 | Peilstocker . |
| 3,622,440 | 11/1971 | Snedeker ............ 156/334 X |
| 3,624,238 | 11/1971 | McKenzie ............ 428/412 |
| 3,657,057 | 4/1972 | Shorr et al. ............ 156/99 X |
| 3,666,614 | 5/1972 | Snedeker ............ 428/428 X |
| 3,764,457 | 10/1973 | Chang ............ 428/412 |
| 3,832,419 | 8/1974 | Merritt ............ 260/47 X A |
| 4,027,072 | 5/1977 | Molari, Jr. ............ 428/412 |
| 4,082,894 | 4/1978 | Yoshida ............ 428/412 |
| 4,188,451 | 2/1980 | Humphrey, Jr. ............ 428/412 |
| 4,190,699 | 2/1980 | Kanazawa et al. ............ 428/412 |
| 4,204,025 | 5/1980 | LeGrand et al. ............ 428/412 X |
| 4,204,026 | 5/1980 | LeGrand et al. ............ 428/412 X |
| 4,207,357 | 6/1980 | Goossens ............ 428/412 X |
| 4,210,699 | 7/1980 | Schroeder et al. ............ 428/412 X |

FOREIGN PATENT DOCUMENTS

| | | |
|---|---|---|
| 203140 | 8/1975 | Argentina . |
| 491366 | 7/1978 | Australia . |
| 828347 | 5/1975 | Belgium . |
| 7512952 | 7/1978 | France . |
| 1504198 | 3/1978 | United Kingdom . |

*Primary Examiner*—Lorraine T. Kendell
*Attorney, Agent, or Firm*—William F. Mufatti

[57] ABSTRACT

Improved impact or shock resistant laminates comprising a plurality of lamina including a back polycarbonate lamina opposite the direction of impact or shock, such back polycarbonate lamina having a relatively hard and brittle overlying or exposed layer or coating opposite the direction of impact, are provided by interposing intermediate layer between said hard and brittle exposed layer and the polycarbonate lamina which intermediate layer is softer and less brittle than said exposed layer, such intermediate layer reducing failure and spalling of the polycarbonate surface opposite the impact or shock receiving surface.

16 Claims, No Drawings

IMPACT RESISTANT LAMINATE

This invention relates to improved impact resistant laminates. More particularly, it relates to such laminates having a plurality of layers or laminate including a back polycarbonate lamina opposite the direction of impact or shock, such polycarbonate lamina having on the exposed surface thereof an exposed relatively brittle and hard coating and interposed between said exposed coating and said polycarbonate an intermediate layer which is relatively softer and less brittle than said exposed coating. These laminates are particularly characterized by the interposition of said intermediate layer between the back polycarbonate ply and the exposed relatively hard and brittle exposed coating which reduces spalling or other failure of the back or downstream polycarbonate surface when the laminates are subject to impact or shock.

BACKGROUND OF THE INVENTION

The use of so-called safety glazing or penetration resistant glazing for windows, windshields and the like utilizing polycarbonate resin layers as a structural component is well known. For example, glass polycarbonate resin laminates are described in U.S. Pat. No. 3,666,614, the glass and polycarbonate being cohered together using an ethylene-vinyl acetate copolymer. In U.S. Pat. No. 3,520,768, there are described laminates of relatively thick glass having a comparatively thin polycarbonate foil on the cohering material. It is also known, as described in U.S. Pat. No. 4,027,072, to utilize certain polysiloxane-polycarbonate block copolymers as an adhesive in preparing polycarbonate containing laminates. It is normal practice in constructing certain such laminates to utilize glass or relatively hard solid resinous materials as the impact or shock receiving layers while utilizing polycarbonate as the back or downstream layer. In those cases where polycarbonate is used as a layer of a laminate, it is often, because of the relative softness of the polycarbonate, protected, especially on its exposed surface, with a mar- or scratch-resistant and transparency-preserving coating. Thus, U.S. Pat. No. 4,123,588 describes a laminate containing a back polycarbonate lamina coated with a scratch resistant-layer of microglass. In general, such mar-resistant coatings which are well known can be metal oxides; modified melamines; ultraviolet light hardenable organics such as acrylated monomers or mixtures of these monomers with acrylate-modified polymeric resins; inorganic glasses such as silica or alumina; polyurethanes; silicones; silicone resins with recurring organic groups such as polymethyl methacrylate; silica, such as colloidal silica, filled silicones; silicone resins derived from epoxy terminated silanes; and polyamide ester resins. These materials, among others, are harder and relatively more brittle than the underlying polycarbonate layer which they protect. It has been found, however, that in impact or shock-resistant laminates utilizing such a relatively hard and brittle coating along with the polycarbonate, the relatively brittle material cracks under impact causing damage to exposed objects behind the laminate. Such spalling occurs because of the so-called "notch sensitive" character of polycarbonates. Thus, if the overlying brittle layer is broken, the fracture lines propagate to the polycarbonate and act as "critical" notches causing the polycarbonates to fail in a brittle manner with little of the energy absorption typical of this normally impact-resistant material. The "notch sensitive" character of polycarbonates is greater, the lower the temperature.

One solution to this problem of notch sensitivity is described in British Pat. No. 1,504,198 which discloses that the notch sensitivity of the polycarbonate lamina coated with a relatively more brittle coating in impact shock resistant laminates is substantially reduced if the thickness of such a lamina is restricted to from 30 to less than 220 mils. The present invention provides another solution to the problem of notch sensitivity in impact and shock resistant laminates which utilize polycarbonate and an overlying relatively more brittle coating.

DESCRIPTION OF THE INVENTION

According to the present invention, it has been found that the notch sensitivity of the back polycarbonate layer coated with a relatively hard and brittle mar-resistant coating on its exposed surface, i.e., the surface opposite the direction of impact or shock, is substantially reduced if an intermediate relatively soft and less brittle layer is interposed between the relatively hard and brittle mar coating and the back polycarbonate lamina.

While the mar-resistant coating is relatively hard and brittle, i.e., it is harder and more brittle than the underlying polycarbonate which it protects, the intermediate layer is softer and less brittle than said mar-resistant coating. The intermediate layer may have a brittleness and hardness ranging from being slightly less brittle and softer than the underlying polycarbonate to being more brittle and harder than the underlying polycarbonate, so long as it is less brittle and softer than the mar-resistant coating.

The mar-resistant, hard and brittle coating has a brittleness and hardness effective to protect the underlying polycarbonate from abrasion, marring, and scratching. Such mar-resistant coatings are known in the art and include metal oxides, modified melamines; ultraviolet hardenable organics such as acrylated monomers or mixtures of these monomers with acrylate-modified polymeric resins such as acrylate modified polyurethanes; inorganic glasses such as silica or alumina; polyurethanes; silicone resins; silicone resins with recurring organic groups such as polymethyl acrylate or methacrylate; silica, such as colloidal silica, filled silicone resins; silicone resins derived from epoxy terminated silanes; polyamide ester resins, and melamine based coatings.

Preferred mar-resistant coatings are the silicone resins, particularly the colloidal silica filled silicone resins, and melamine based coatings. The colloidal silica filled silicone resin type mar-resistant coatings are described in U.S. Pat. Nos. 4,027,073 and 4,159,206, all of which patents are hereby incorporated by reference.

The intermediate or primer layer which is disposed between the abrasion resistant top coating and the polycarbonate is an organic polymeric material characterized by (i) being less brittle and softer than said abrasion resistant coatings; and (ii) being effective in reducing spalling of the underlying polycarbonate layer. Preferred intermediate layers are comprised of acrylate polymers, both thermoset polyacrylates and thermoplastic polyacrylates.

The term "thermoplastic polyacrylate" as used herein is meant to embrace within its scope those polymers or resins resulting from the polymerization of one or more acrylate monomers such as, for example, methylacrylate, ethyl acrylate, butyl acrylate, 2-ethylhexyl acrylate, etc. as well as the methacrylates such as, for instance, methyl methacrylate, ethyl methacrylate, butyl methacrylate, hexyl methacrylate, etc. Copolymers of the above acrylate and methacrylate monomers are also included within the term "thermoplastic polyacrylate" as it appears herein. The polymerization of the monomeric acrylates and methacrylates to provide the thermoplastic polyacrylate resins useful in the practice of the instant invention may be accomplished by any of the well known polymerizations techniques.

The term "thermoplastic polyacrylate" as used herein is also meant to embrace thermoplastic acrylic or methacrylic polymers containing functional groups. These polymers result from the polymerization of one or more substituted acrylic or methacrylic monomers represented by the general formula

$$CH_2=CY-COOR^1X \qquad (I)$$

wherein Y is H or a methyl radical; $R^1$ is a divalent saturated aliphatic hydrocarbon radical, preferably one containing from 1 to about 20 carbon atoms; and X is selected from hydroxyl, carboxyl, amine, epoxide, amide, SH, $SO_3H$, $COOR^2$ and $Si(OR^3)_3$ radicals, wherein $R^2$ and $R^3$ are alkyl radicals, preferably alkyl radicals containing from 1 to about 20 carbon atoms. Copolymers resulting from the polymerization of unsubstituted acrylate or methacrylate monomers, as described above, with substituted acrylate or substituted methacrylate monomers are also included herein. Illustrative of these copolymers are those obtained by copolymerizing ethyl methacrylate and hydroxymethyl methacrylate, ethyl methacrylate and gamma-methacryloxy-propyl-trimethoxysilane, and methyl acrylate and hydroxy ethyl acrylate.

The term "thermoset polyacrylates" used herein is meant to embrace those acrylate and methacrylate polymers which contain cross-linking. Exemplary thermoset polyacrylates are set forth, for example, in Encyclopedia of Polymer Science and Technology Vol. 1, Interscience Publishers, John Wiley & Sons, Inc., copyright 1964, at p. 273 et seq., and in Chemistry of Organic Film Formers, by D. H. Solomon, John Wiley & Sons, Inc., 1967, at p. 25 et seq. and the references cited therein, all of which are incorporated herein by reference.

Generally, the thermoset polyacrylates may be categorized in three general classes. One of these classes represents an acrylic copolymer having reactive functional groups which are capable of reacting between themselves to effect a crosslinkage thereof. It will, of course, be apparent that these functional groups may be the same, provided they are of the type which will react between themselves, or the copolymer may have two different types of reactive functional groups therein, such as, for example, an epoxide group and a carboxyl group. Another type is an acrylic copolymer having a reactive functional group to which there is added an appropriate compatible accelerator, or polymeric cross-linking agent, which will react with the functional group to effect the needed cross-linking. A common thermoset acrylic is a copolymer of styrene and/or methylacrylate, ethylacrylate, and acrylamide or methacrylamide which is converted to a thermoset acrylic by post-reaction with formaldehyde and an alcohol. The other type, which is actually a modification of the type immediately described above represents a mixture of two polymers having cross-linkable functional reactive groups. Both of these polymers may be acrylic copolymers having reactable, cross-linkable, functional groups thereon, or one of the polymers may be an acrylic copolymer having a reactive functional group and the other polymer may represent one or more other types of known polymers having functional groups which likewise are reactable with the acrylic functional group to provide the thermoset product as a result of cross-linking.

Representative of the latter type of thermoset acrylics are mixtures of an acrylic copolymer containing copolymerized acrylamide units and a urea formaldehyde resin, an acrylic copolymer containing copolymerized acrylic acid or methacrylic acid units and a bisphenol-A type epoxy resin, an acrylic copolymer containing reactable carboxyl and hydroxyl functional groups and an amine formaldehyde resin. Another system which is in effect a mixture of polymers is a mixture of an acrylic copolymer, wherein one of the monomers is methacrylic acid or acrylic acid, a partially condensed phenyl formaldehyde resin and a polyepoxide resin, which ternary mixture may be cured to a thermoset condition, for example, by employing a butylated melamine resin as a catalyst.

Typically, the reactions involved in cross-linking the thermosettable acrylic polymers are reactions between, for example: epoxide functional groups and amine functional groups; epoxide functional groups and acid anhydride functional groups; epoxide functional groups and carboxyl functional groups, including phenolic hydroxyl groups; epoxide functional groups and N-methylol or N-methylol-ether; carboxyl functional groups and N-methylol or N-methylol-ether functional groups; interreaction between carboxyl and isocyanate groups; reactions between hydroxyl, for example, polyols, and isocyanate groups, and reactions between amine groups and N-methylol or N-methylol-ether groups. Those skilled in the art will readily select the appropriate system for their particular purposes. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerization a monomer which supplies the needed reactive functional group into the polymer chain. Usually, this copolymerizable functional group-supplying mlnomer will be present in small amounts, that is, on the order of 25 weight percent or less, and typically, between about 1 and 20 percent of the monomer mass which is polymerized. Exemplary of these functional group-supplying monomers are glycidyl acrylate, glycidyl methacrylate, allyl glycidyl ether, dimethylaminoethyl methacrylate, vinyl pyridine, tert-butylaminoethyl-methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate. Usually, the other monomer which will be polymerized along with the monomer supplying the functional group is a lower ($C_1$-$C_3$) alkyl acrylic ester or mixtures thereof, e.g., methyl acrylate, ethyl acrylate, methyl methacrylate, ethyl methacrylate, styrene, or mixtures thereof, in an amount ranging between about 75 parts to about 99 parts and, more typically, between about 80 parts to about 97 parts.

Generally, the combined thickness of the mar-resistant coating and the softer, less brittle intermediate layer ranges from about 0.05 to about 2 mils and preferably from about 0.1 to about 1 mil. Generally, the mar-resistant coating is from 10 to 100 times thicker than the intermediate layer. Thus, generally, the mar-resistant coating has a thickness of from about 0.0495 to about 1.8 mils and preferably from about 0.099 to about 0.9 mil while the intermediate layer has a thickness of from about 0.0005 to about 0.2 mil and preferably from about 0.001 to about 0.1 mil.

The front or impact shock receiving layers may be selected from the group consisting of glass, polycarbonate, or solid resinous materials which may include epoxy, polyurethane, chlorinated aromatic ether, polyether sulfone, acrylic (polymethylmethacrylate) and rubber modified acrylics, polyarylsulfone, polystyrene, cellulose acetate butyrate, polyesters, bisphenol fluorenone polycarbonate, and phenolphthalein based polycarbonate, among others.

Any polycarbonate resin can be used as laminae for both the impact or shock receiving layers and also the back polycarbonate lamina including but not limited to those described in U.S. Pat. Nos. 3,161,615, 3,220,973, 3,312,659, 3,312,660, 3,313,777, 3,666,614, among others, all of which are included herein by reference. Any of the usual types of glass used in so-called safety applications can be used in conjunction with the present invention including coated or uncoated and chemically and thermally strengthened or tempered glass as well as common untempered glass where indicated. Preferably, these layers are transparent.

Where desirable, adhesion-promoting primers can be used to promote adhesion, such material being well known and including, among others, vinyl alkoxy silanes, aminoalkylalkoxy silanes, alkoxy silanes, silyl perioxides and amino-alkoxy silanes, such materials being described in the above U.S. Pat. No. 3,666,614 and elsewhere. A present advantage is that primers are usually not necessary in connection with any polycarbonate or resin used although they can be used where indicated.

Any conventional adhesives may be used between the laminae including polyvinylbutyrals, ethylene tetrapolymers, epoxies, polyurethanes, silicones, acrylics, and ethylene acrylic acids, among others. The interlayer in contact with any polycarbonate ply and most specifically the polycarbonate back ply must provide not only good adhesion but also must be chemically compatible with the sensitive polycarbonate. The preferred interlayer for contact with the polycarbonate laminae is a polysiloxane-polycarbonate block copolymer.

The polysiloxane-polycarbonate block copolymers can be expressed by the average formula about 200, inclusive; b is equal to from about 5 to about 200, inclusive, and preferably b has an average value from about 15 to about 90, inclusive, while the ratio of a to b can vary from about 0.05 to about 3, inclusive, and when b has an average value of from about 15 to about 90, inclusive, the ratio of a to b is preferably from about 0.67 to about 0.45, inclusive; and d is 1 or more; Y is

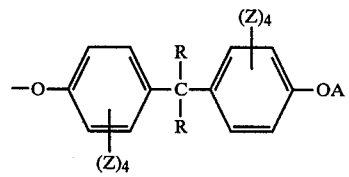

A is a member selected from the class of hydrogen and

R is a member selected from the class of hydrogen, monovalent hydrocarbon radicals and halogenated monovalent hydrocarbon radicals; R' is a member selected from the class of monovalent hydrocarbon radicals, halogenated monovalent hydrocarbon radicals and cyanoalkyl radicals; R" is a member selected from the class consisting of monovalent hydrocarbon radicals and halogenated hydrocarbon radicals; and Z is a member selected from the class of hydrogen, lower alkyl radicals and halogen radicals and mixtures thereof.

Included within the radicals represented by R of Formula II are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aforementioned radicals, while R is preferably methyl, R' includes all radicals included by R above except hydrogen, where R' can also be all the same radical or any two or more of the aforementioned R radicals except hydrogen, and R' is preferably methyl. R' also includes, in addition to all the radicals included by R, except hydrogen, cyanoalkyl radicals such as cyanoethyl, cyanobutyl, etc., radicals. Radicals that are included within the definition of Z of Formula I are hydrogen, methyl, ethyl, propyl, chloro, bromo, iodo, etc., and combinations thereof, and Z is preferably hydrogen.

These hydrolytically stable copolymers can be further described as comprising recurring copolymeric units of a polydiorganosiloxane joined by substituted aryloxy-silicon linkages to a polyester of dihydric phe-

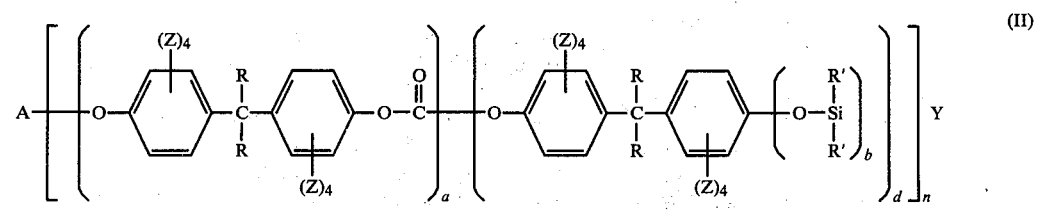

where n is at least 1, and preferably n is an integer equal to from 1 to about 1000, inclusive; a is equal to from 1 to nol and a precursor of carbonic acid, where each of said recurring copolymeric units comprises by average weight from about 10% to about 75% of said polydiorganosiloxane, and preferably from about 40 to 70% by weight.

The copolymers of Formula II can be produced by reacting at temperatures in the range of 0° C. to 100° C., preferably 20° C. to 50° C., and in the presence of an acid acceptor, a mixture of a halogen chain-stopped polydiorganosiloxane having the formula

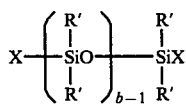
(III)

and a dihydric phenol having the formula

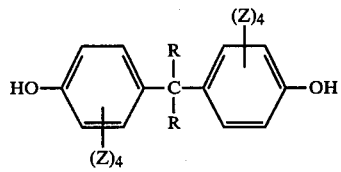
(IV)

and thereafter phosgenating said reaction product until the resulting copolymer achieves a maximum intrinsic viscosity, where R, R', Z and b are as defined above, and X is a halogen radical, preferably chloro.

The halogen chain-stopped polydiorganosiloxanes of Formula III can be made by conventional procedures such as by the controlled hydrolysis of a diorganodihalosilane, for example, dimethyldichlorosilane, as taught in Patnode U.S. Pat. No. 2,381,366 and Hyde U.S. Pat. Nos. 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4 to about 35% by weight, and preferably from about 1 to about 10% by weight of said halogen chain-stopped polysiloxane. The halogen chain-stopped polysiloxane is preferably in the form of a chlorinated polydimethylsiloxane.

Dihydric phenols that are included in Formula III are, for example, 2,2-bis(4-hydroxyphenyl)propane (bisphenol-A); 2,4'-dihydroxydiphenylmethane; bis-(2-hydroxyphenyl)methane; bis-(4-hydroxyphenyl)methane; 1,1-bis-(4-hydroxyphenyl)ethane; 1,2-bis-(4-hydroxyphenyl)ethane; 1,1-bis-(4-hydroxy-2-chlorophenyl)ethane; 1,1-bis-(2,5-dimethyl-4-hydroxyphenyl)ethane; 1,3-bis-(3-methyl-4-hydroxyphenyl)propane; 2,2-bis-(3-isopropyl-4-hydroxyphenyl)propane, etc. Mixtures can also be used. Others will occur to those skilled in the art.

These copolymers essentially comprise recurring units consisting of a polydiorganosiloxane interconnected by substituted aryloxy-silicon linkages to a polyester of carbonic acid precursor and a dihydric phenol.

Materials of the above nature are also described in U.S. Pat. No. 3,189,662 included herein by reference and can be used either alone as such or in conjunction with well known modifiers to provide particular desired characteristics.

Illustrative of the above block copolymers is General Electric LR-3320. This material has a specific gravity of 1.12, a tensile strength of 2500 to 3900 psi; an elongation of 230 to 430; a tear strength (Die C) of 400 lbs./in.; and a brittleness temperature below −76° F.; and a heat deflection temperature (10 mils under 66 psi Load) of 160° F.

Another such block copolymer, specifically General Electric LR-5530, has a specific gravity of 1.07; a tensile strength of 2200 to 2500 psi; an elongation of 500-700%; a tear (Die C) of 200 lbs./in.; and a brittleness temperature below −76° F.; and a heat deflection temperature (66 psi) of 130° F.

Where a polycarbonate layer without further description or designation is mentioned herein, it is the polycarbonate of bisphenol-A or 2,2-bis(4-hydroxyphenyl)propane.

One particularly useful mar-resistant, hard and brittle coating is a melamine based coating. One particularly useful melamine based coating is one which is comprised of four constituent components. The first component is a melamine represented by the general formula

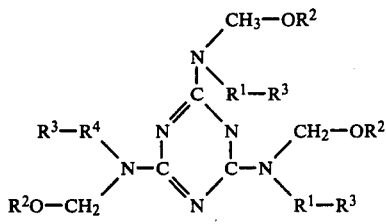
(V)

wherein $R^2$ is independently selected from hydrogen or a lower alkyl group, preferably one containing from 1 to about 4 carbon atoms; $R^4$ is independently selected from an alkylene group, preferably one containing from 1 to about 4 carbon atoms; and $R^3$ is independently selected from hydroxy, a lower alkoxy group, preferably one containing from 1 to about 4 carbon atoms, or a lower alkyl group, preferably one containing from 1 to about 4 carbon atoms. Preferably, the melamine compound represented by Formula I is a hexaalkyl ether of hexamethylol-melamine represented by the general formula

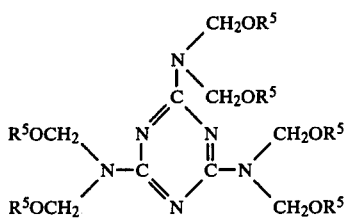
(VI)

wherein $R^5$ is independently selected from a lower alkyl group, preferably one containing from 1 to about 4 carbon atoms.

Some non-limiting specific examples of compounds represented by Formula VI above include hexabis(methoxymethyl)melamine, hexabis(ethoxymethyl)melamine, hexabis(n-propoxymethyl)melamine, hexabis(n-butoxymethyl)melamine, hexabis(t-butoxymethyl)melamine, and hexabis(isobutoxymethyl)melamine.

The second component is a polyester polyol or a polyether polyol. The polyester polyol or polyether polyol may be selected from a wide variety of polyols such as triols, tetrols, and the like and mixtures thereof containing aliphatic groups, polyaliphatic ether groups, or polyaliphatic ester groups. While it is possible to have some aromatic, cycloaliphatic and branched aliphatic groups, it is preferred in the practice of the present invention that the organic moieties be subsequently linear aliphatic moieties. The aliphatic polyester polyols are generally the more preferred compounds.

Any suitable polyhydroxyl polyester may be used such as, for example, the reaction product of a polycarboxylic acid and a polyhydric alcohol. Any suitable polycarboxylic acid may be used in the preparation of a polyester such as, for example, adipic acid, succinic acid, suleric acid, selacic acid, oxalic acid, methyladipic acid, glutaric acid, pimelic acid, azelaic acid, phthalic acid, terephthalic acid, isophthalic acid, 1,2,4-benzene tricarboxylic acid, thiodiglycollic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, diethylene glycol, propylene glycol, butanediol, hexane diol, hexane triol, glycerine, bis-(hydroxy-methylcyclohexane), trimethylol propane, pentaerythritol and the like.

Any suitable polyhydric poly(alkylene ether) may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology", volumn 1, pages 257 to 262, published by Interscience Publishers in 1951. Among the commercially available aliphatic polyester polyols which are particularly well suited to the practice of the instant invention are the polyester polyols sold under the trade designation Multron R-10, Multron R-12, and Desmophen 1100 by Mobay Chemical Company. Multron R-12, for example, has a molecular weight of about 1000 and has three hydroxyl groups per molecule. The material has an average equivalent weight, based on hydroxyl groups, of about 330.

A third constituent component of the coating composition is a diol, preferably a lower alkyl diol containing from 2 to about 8 carbon atoms. Some such limiting examples of these preferred diols are 1,4-butanediol, 1,2-ethanediol, 1,2-propanediol, 1,3-propanediol, 1,2-butanediol, 2,3-dimethyl-2,3-butanediol, and the like.

The coating composition also contains an adhesion and leveling agent. Generally, this adhesion and leveling agent contains an aminoplast, preferably a melamine compound. The adhesion and leveling agent which has been found to be extremely effective in formulating the coating of the present invention is one sold under manufacturers code identification R-830 by Bee Chemical Company, Lansing, Ill., which contains the reaction product of a melamine compound and a hydroxylized functionalized acrylate.

The cured coating composition containing the aforedescribed melamine compound, polyester or polyether polyol, diol, and adhesion and leveling agent possess the following properties: non-melt-drip, abrasion and mar resistance, resistance to chemical attack, good adhesion to the polycarbonate substrate, and compatibility with the polycarbonate substrate, e.g., the coating does not adversely affect the polycarbonate substrate by stress cracking and crazing it, by causing crack propogation into the polycarbonate as a result of brittleness of the coating itself and/or reducing the properties of the polymer generally, such as, for example, impact resistance, elongation, tensile strength and so on.

These melamine based coating compositions are prepared by first formulating a pre-reaction mixture by mixing together the diol, the melamine compound of Formula V, the polyester polyol or polyether polyol, and the aminoplast adhesion promoter and leveling agent and thereafter curing the pre-reaction mixture in place on the polycarbonate article. Also generally added to this mixture are a catalytic amount of an acid catalyst and solubilizing amount of a solvent. This pre-reaction mixture is kept from reacting until after it is applied onto the polycarbonate substrate. This is accomplished by keeping the temperature below about 40° C. and/or including in the pre-reaction mixture a volatile acid catalyst blocking agent such as an amine, e.g., triethylamine. After the pre-reaction mixture has been applied to the polycarbonate substrate, it is initiated by heating the pre-reaction mixture coated polycarbonate substrate. Heating is continued until the coating is cured, i.e., cross-linking is finished. If an acid catalyst blocking agent such as a volatile amine is present, heating serves to volatilize the amine thus removing it from the mixture and thereby freeing the catalyst to catalyze the reaction.

Generally, the reaction can be carried out at atmospheric, subatmospheric or superatmospheric pressure, with atmospheric pressures being preferred. The temperature at which the reaction products are produced generally range from about 50° C. to about 150° C., preferably from about 80° C. to about 120° C.

The weight ratio of the diol to the melamine compound of Formula V to the polyester or polyether polyol ranges from about 1:1.3 to about 3:3.1, respectively, with a ratio of about 1:2.1 being preferred. The weight ratio of the diol, melamine compound of Formula I and polyester or polyether polyol to the adhesion promoter and leveling agent, such as the R-830 produced by Bee Chemical Company, ranges from about 2:1 to about 10:1, respectively.

The acid catalysts which may be employed include such acids as sulfonic acid, hydrochloric acid, p-toluene sulfonic acid and the like as well as such organic acids as phthalic acid, oxalic acid, acetic acid, chloroacetic acid and the like. The amount of catalyst employed is a catalytic amount, i.e., an amount effective to catalyze the reaction. Generally, this amount ranges from about 0.1% of about 5.0%, preferably from about 1.0% to about 2.0%, by weight, of the coating composition.

The pre-reaction mixture preferably contains an organic solvent. Examples of suitable solvents include the ketones, such as acetone, methyl ethylketone; alcohols, such as methyl alcohol and propyl alcohol; the aromatic hydrocarbons such as benzene; dioxane; butyl acetate; and the like. The concentration of the solvent employed is not critical and generally any amount which solubilizes the reaction components is all that is necessary.

The coating compositions may, if desired, also contain such additives as antioxidants, accelerators, dyes, inhibitors, activators, fillers, pigments, antistatic agents, thickeners, thixotropic agents, surface active agents, viscosity modifiers, extending oils, plasticizers, tackifiers, UV light absorbing agents and the like. Such additives are usually preblended with the aforedescribed reactants prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to about 5000 parts or more per 100 parts of active coating ingredients by weight and preferably about 0.0005 to about 300 parts on the same basis.

Another particularly useful mar-resistant hard and brittle coating is one which contains a thermoset organopolysiloxane. These coatings are generally obtained by applying an organopolysiloxane coating composition containing a further-curable organopolysiloxane onto the primed polycarbonate and then curing, i.e., by the application of heat, the further-curable organopolysiloxane to form a thermoset organopolysiloxane-containing coating.

The further-curable organopolysiloxane used in the practice of the instant invention is the partial hydrolysis and condensation product of at least one compound represented by the general formula $$R^6_e SiZ_{(4-e)} \qquad (VII)$$

wherein $R^6$ represents a monovalent hydrocarbon radical and a halogenated monovalent hydrocarbon radical; Z represents a hydrolyzable group and n may vary between 0 and 2. More specifically, Z is independently a member such as halogen, alkoxy, acyloxy and aryloxy.

Preferably, $R^6$ represents an alkyl radical containing from 1 to about 8 carbon atoms such as methyl, ethyl, and propyl through octyl (both normal and isomeric), an alkenyl radical containing from 2 to about 8 carbon atoms, such as vinyl and the normal and isomeric forms of propenyl through octenyl, and the phenyl radical; Z preferably represents an alkoxy radical containing from 1 to about 8 carbon atoms such as methoxy, ethoxy, propoxy, heptoxy, octoxy and the like, an acyloxy radical containing from 2 to about 9 carbon atoms such as acetoxy, propionoxy, butyroxy, pentanoxy, hexanoxy, and the like. and a phenoxy radical; and e is an integer from 0 to 2.

Preferred compounds of Formula VII are silanes of the formula $$R^7_f Si(OR^8)_{4-f} \qquad (VIII)$$

and silanes of the formula $$R^9_g Si(OCOR^{10})_{4-g} \qquad (IX)$$

wherein $R^7$ and $R^8$ represent a monovalent hydrocarbon radical and a halogenated monovalent hydrocarbon radical, preferably an alkyl radical containing from 1 to about 8 carbon atoms, an alkenyl radical containing from 2 to about 8 carbon atoms, and the phenyl radical; $R^9$ and $R^{10}$ represent monovalent hydrocarbon radicals and halogenated monovalent radicals such as alkyl radicals and phenyl radicals, but are preferably alkyl radicals of 1 to 8 carbon atoms; f is 0 or 1; and g varies from 0 to 2.

Upon hydrolysis, the compounds of Formula VII, and more specifically those of Formulae VIII and IX, are converted to the corresponding silanols. Upon generation of the silanol, there is condensation of the hydroxyl substituents to form —Si—O—Si— bonding. The condensation is not complete, but rather the organopolysiloxane retains a quantity of silicon-bonded hydroxyl group. This partial condensate can be characterized as further-curable, i.e., further condensable, siloxanol polymer.

The further-curable organopolysiloxane may be formulated into the top-coat composition as a solution of the further-condensable siloxanol polymer in water and alcohol by-product as a concentrated solution of further-condensable siloxanol in water and alcohol by-product formed by evaporating off a substantial quantity of the alcohol by-product and water, or it may be formulated onto the top-coat composition as a solid partially pre-cured product by evaporating off a substantial amount of alcohol by-product and water and then partially precuring and solidifying the concentrated product.

Examples of good silicone top coats are the foregoing alkoxy and aryloxy functional silanes represented by Formula VIII and acyloxy functional silanes represented by Formula IX. Such alkoxy functional, aryloxy functional, and acyloxy functional silanes are well known materials to silicone manufacturers and are easily obtainable.

With respect to the acyloxy functional silanes, these materials are generally applied without any solvent since it has been found that the use of solvents in the application of such top coats at times seriously degrades the applied silicone top coat. Preferably, the silanes of Formula IX, that is the acyloxy functional silanes, are applied at 100% solids or from 20 to 100% solids. In the case of the acyloxy silanes where the solids are less than 100%, the silane is simply the water hydrolysis and partial condensation product of the foregoing acyloxy functional silanes of Formula IX. The alkoxy and aryloxy functional silanes of Formula VIII are generally applied from a top-coat composition containing solvents in a solids concentration of from about 20 to 95% by weight. Examples of solvents which may be used in the formulation of the top-coat composition include methanol, ethanol, butanol, ethyl acetate, benzene, toluene, xylene, ethylene glycol and the like. However, the alkoxy and aryloxy functional silanes may also, similarly to the acyloxy functional silanes, be applied from a top-coat composition which contains no solvents other than the alcohol by-product and water used to form the partial hydrolysis and condensation products of these silanes.

With respect to the foregoing aryloxy functional, alkoxy functional and acyloxy functional silanes mentioned above, such materials are well known in the art as, for instance, in U.S. Pat. Nos. 3,888,815 and 3,701,753, both of which are incorporated herein by reference.

One particular class of further-curable organopolysiloxanes which are employed in the top-coat compositions of the present invention are the partial hydrolysis and condensation products of alkoxy functional silanes, preferably alkyltrialkoxysilanes, preferably those alkyltrialkoxysilanes wherein the alkyl group contains from 1 to about 8 carbon atoms, and aryltrialkoxysilanes, preferably phenyltrialkoxysilanes, or mixtures thereof, wherein the alkoxy group contains from 1 to about 8 carbon atoms, such as, for example, methoxy, ethoxy, isopropoxy, butoxy, pentoxy, hexoxy, octoxy and the like. The further-curable organopolysiloxanes are generally prepared by a process wherein the alkyltrialkoxysilane, aryltrialkoxysilane, or a mixture of alkyltrialkoxysilane and aryltrialkoxysilane is heated in the presence of water, wherein the molar ratio of water to total silane is at least about 1.5:1 and in the presence of an effective amount of a hydrolysis catalyst, such as a mineral acid, for example, HCl, for about 1 to about 10 hours at a temperature between ambient and reflux to produce a siloxane partial condensation product; the partial condensation product is then concentrated by heating to remove 50 to about 90 mole percent alkanol by-product and some water, and thereafter, the concentrated partial condensation product is precured by heating at a temperature below the gel point thereof and generally in the range of about 70° to 300° C. to produce the solvent-soluble, further-curable organopolysiloxane. This precured solvent-soluble, further-curable organopolysiloxane is then dissolved in a suitable solvent to form the top-coat composition and the primed polycarbonate substrate is then coated with this top-coat composition. The solvent is then evaporated and the residual further-curable organopolysiloxane is cured to a thermoset state to provide a uniformly and tenaciously adhered top coat on the primed polycarbonate substrate. The curing is effected at elevated temperatures in the range of about 50° to 135° C. for times between about 1 hour and about 72 hours, depending on the temperature at which the cure is effected. The silicone top coat generally should be cured preferably at an elevated temperature to effect the proper cure, but the temperature should be below the glass transition temperature of the polycarbonate. Of course, if the glass transition temperature of the polycarbonate is exceeded, then the polycarbonate part may become deformed and lose its utility.

One particular further-curable organopolysiloxane that can be employed in the top-coat composition of the instant invention is the partial hydrolysis and condensation product of methyltriethoxysilane. This further-curable organopolysiloxane is prepared by hydrolyzing methyltriethoxysilane with water in the presence of an effective amount of a hydrolysis catalyst, such as HCl, for about 1 to 10 hours at a temperature generally between 40° C. and reflux temperature, to produce a partial condensation product. This partial condensation product is then concentrated by heating to remove some of the alkanol by-product and water. This concentrated product is then partially pre-cured at a temperature of about 70° to about 300° C. and below the gel point thereof and then solidified to provide a solid, solvent-soluble, further-curable organopolysiloxane. The solid, solvent-soluble, further-curable organopolysiloxane is then dissolved to a desired concentration in a suitable solvent to form the top coat composition. The top-coat composition is then applied to the primed polycarbonate substrate, after which the solvent is evaporated and the further-curable organopolysiloxane finally cured to provide a hard, abrasion and chemical solvent resistant, thermoset organopolysiloxane top coat in the polycarbonate substrate.

Another further-curable organopolysiloxane which may be employed in the practice of the present invention is the partial hydrolysis and condensation product of a mixture of methyltriethoxysilane and phenyltriethoxysilane. This organopolysiloxane is prepared by hydrolyzing a mixture of methyltriethoxysilane and phenyltriethoxysilane with water in the presence of a hydrolysis catalyst such as HCl to produce a partial condensation product. This partial condensation product is then concentrated by heating to remove a substantial amount of the alkanol by-product and some water. This concentrated product is then partially pre-cured by heating and then solidified to provide a solid, solvent-soluble, further-curable organopolysiloxane. The solid, solvent-soluble, further-curable organopolysiloxane is then dissolved to a desired concentration in a suitable solvent to form the top-coat composition containing a further-curable organopolysiloxane. The top-coat composition is then applied to the primed polycarbonate substrate, after which the solvent is evaporated and the further-curable organopolysiloxane is finally cured to provide a tenaciously and durably adhered, abrasion and chemical resistant thermoset organopolysiloxane top coat on the polycarbonate substrate.

These are not the only silicones that may be utilized in the top coats of the instant invention. Less preferred silicones which can be utilized to form the top coats of the present invention are, for instance, silicone resins composed of trifunctional and difunctional units, silicone resins composed of trifunctional units, difunctional units and tetrafunctional units when the organo substituent groups in the trifunctional units may be selected from hydrocarbon radicals of 1 to about 8 carbon atoms and are preferably methyl, phenyl and vinyl; and wherein the organo substituent groups in the difunctional siloxy units may be selected from hydrocarbon units of from 1 to about 8 carbon atoms, preferably alkyl radicals, vinyl radicals and phenyl radicals. Such silicone resins utually have an organic to silicon atom ratio of 1:1 to 1.9:1; may have a silanol content that varies anywhere from 4 to 10 weight percent and optionally may have an alkoxy content that varies from 2 to 4%. The preparations of such silicone resins which may be utilized as top coats in the invention of the instant case are, for instance, to be found in U.S. Pat. Nos. 3,375,223, 3,435,001, 3,450,672, 3,790,527, 3,832,319, 3,865,766, 3,887,514 and 3,925,276.

Yet another particularly useful mar-resistant hard and brittle coating is one which contains a colloidal silica filled thermoset organopolysiloxane. These coatings are generally obtained by applying a colloidal silica filled organopolysiloxane coating composition containing colloidal silica and a further-curable organopolysiloxane onto the primed polycarbonate and then curing, i.e., by the application of heat, the further-curable organopolysiloxane to form a coating containing a colloidal silica filled thermoset organopolysiloxane.

This colloidal silica-filled further-curable organopolysiloxane top-coat composition as disclosed in U.S. Pat. Nos. 3,986,977 and 4,027,073 comprises a dispersion of colloidal silica in a lower aliphatic alcohol-water solution of the partial condensate of a silanol having the formula $$R^{11}Si(OH)_3 \qquad (X)$$

wherein $R^{11}$ is selected from the group consisting of alkyl radicals containing from 1 to 3 carbon atoms, the vinyl radical, the 3,3,3-trifluoropropyl radical, the gamma-glycidoxypropyl radical and the gamma-methacryloxypropyl radical, with at least 70 percent by weight of said silanol being $CH_3Si(OH)_3$. This composition generally contains from about 10 to about 50 percent by weight of solids, said solids consisting essentially of a mixture of from about 10 to about 70 percent by weight of colloidal silica and from about 30 to about 90 percent by weight of the partial condensate of a silanol. The partial condensate of a silanol, i.e., a soloxanol, is obtained, preferably, entirely from the condensation of $CH_3Si(OH)_3$, however, the partial condensate may also optionally be comprised of a major portion which is obtained from the condensation of $CH_3Si(OH)_3$ and a minor portion which is obtained from the condensation of monoethyltrisilanol, monopropyltrisilanol, monovinyltrisilanol, mono gamma-methacryloxy-propyltrisilanol, mono gamma-glycidoxypropyltrisilanol, or mixtures thereof. The composition further contains sufficient acid to provide a pH in the range of 3.0 to 6.0. The pH is maintained in this range in order to prevent premature gellation and increase the shelf life of the silica-filled organopolysiloxane top-coat composition and to obtain optimum properties in the cured coating. Suitable acids include both organic and inorganic acids such as hydrochloric, chloroacetic, acetic, citric, benzoic, formic, propionic, maleic, oxalic, glycolic and the like. The acid can be added to either the silane, which hydrolyzes to form the silanol component of the composition, or the hydrosol prior to mixing the two components.

The trisilanol component of the top-coat composition of the present invention is generated in situ by the addition of the corresponding trialkoxysilanes to aqueous dispersions of colloidal silica. Suitable trialkoxysilanes are those containing methoxy, ethoxy, isopropoxy and t-butoxy substituents. Upon generation of the silanol in the acidic aqueous medium, there is condensation of the hydroxyl substituents to form—Si—O—Si—bonding. The condensation is not complete, but rather the siloxane retains an appreciable quantity of silicon-bonded hydroxyl groups, thus rendering the organopolysiloxane polymer soluble in the water-alcohol solvent. This soluble partial condensate can be characterized as a siloxanol polymer having at least one silicon-bonded hydroxyl group per every three—SiO—units. During curing of the top coating composition on the primer, these residual hydroxyl groups condense to give a silsesquioxane, $R^{11}SiO_{3/2}$.

The silica component of the top-coat composition is present in the form of colloidal silica. Aqueous colloidal silica dispersions generally have a particle size in the range of 5 to 150 millimicrons in diameter. These silica dispersions are prepared by methods well known in the art and are commercially available. It is preferred to use colloidal silica having a particle size in the range of 10 to 30 millimicrons in diameter in order to obtain dispersions having a greater stability and to provide top coatings having superior optical properties.

The silica-filled organopolysiloxane top-coat compositions are prepared by adding trialkoxysilanes to colloidal silica hydrosol and adjusting the pH to a range of 3.0 to 6.0 by the addition of acid. As mentioned previously, the acid can be added to either the silane or the silica hydrosol before the two components are mixed. Alcohol is generated during the hydrolysis of the trialkoxy silanes to the trisilanols. Depending upon the percent solids desired in the final coating composition, additional alcohol, water, or a water-miscible solvent can be added. Suitable alcohols are the lower aliphatic alcohols such as methanol, ethanol, isopropanol, t-butanol, and mixtures thereof. Generally, the solvent system should contain from about 20 to about 75 weight percent alcohol to ensure solubility of the siloxanol formed by the condensation of the silanol. If desired, a minor amount of an additional water-miscible polar solvent such as acetone, butyl cellosolve, and the like can be added to the water-alcohol solvent system. Generally, sufficient alcohol or water-alcohol solvent is added to give a composition containing from about 10 to about 50 percent by weight of solids, said solids generally comprising from about 10 to about 70 percent by weight of colloidal silica and from about 30 to about 90 percent by weight of the partial condensate of the silanol. The composition is allowed to age for a short period of time to ensure formation of the partial condensate of the silanol, i.e., the siloxanol. This condensation occurs upon generation of the silanol in the acidic aqueous medium through the hydroxyl substituents to form Si—O—Si bonding. The condensation is not complete, resulting in a siloxane having an appreciable quantity of silicon-bonded hydroxyl group. This aged, silica-filled further-curable organopolysiloxane top-coat composition is then applied onto the primed polycarbonate by any of the commonly known methods such as dipping, spraying, flow-coating and the like. After the top-coat composition is applied to the primed polycarbonate, the polycarbonate is air dried to evaporate the volatile solvents from the top-coat composition. Thereafter, heat is applied to cure the top coat. During curing, the residual hydroxyls of the siloxane condense to give a silsesquioxane, $R^{11}SiO_{3/2}$. The result is a silica-filled cross-linked organopolysiloxane top coat which is tenaciously adhered to the substrate and is highly resistant to scratching, abrasion, chemical solvents, and marring. Generally, the top coat contains from about 10 to about 70 weight percent silica and from about 30 to about 90 weight percent of the organopolysiloxane present as the silsesquioxane $R^{11}SiO_{3/2}$.

PREFERRED EMBODIMENT OF THE INVENTION

In order that those skilled in the art may better understand how the present invention may be practiced, the following examples are given by way of illustration and not by way of limitation. Unless otherwise specified, all percentages and parts are by weight.

A colloidal silica-filled further-curable organopolysiloxane top-coat composition is prepared as follows: Glacial acetic acid (0.2 grams) is added to 200 grams of a commercially available aqueous dispersion of colloidal silica having an initial pH of 3.1 containing 34% $SiO_2$ of approximately 15 millimicron particle size and having a $Na_2O$ content of less than 0.01 weight percent. Methyltrimethoxysilane (138 grams) is added to the stirred acidified dispersion generating methanol and methyltrisilanol. After standing for about one hour, the pH of the composition stabilizes as 4.5. The pH of the composition is adjusted to a range of from 3.7 to 5.6. The composition is aged for 4 days to ensure formation of the partial condensate of $CH_3Si(OH)_3$ in the silica methanol-water dispersion. The composition contains 40% solids, half of which is $SiO_2$ and the other half silicone calculated on the basis $CH_3SiO_{3/2}$ weight available in the cured composition. The aged composition is diluted to 25 weight percent solids by addition of isopropanol.

One side of a 500 mil thick polycarbonate sheet is primed with a thermosettable acrylic containing primer composition. The primer composition coated sheet is then baked at 125° C. for 30 minutes to effect the cure of the thermosettable acrylic to the thermoset state, thereby producing a polycarbonate sheet primed with a thermoset acrylic containing primer layer. The primed sheet is then coated with the colloidal silica-filled organopolysiloxane top-coat composition described above. The primed and coated sheet is then baked at 125° C. for one hour to cure the organopolysiloxane to a thermoset stage, thereby producing a primed polycarbonate sheet having a colloidal silica-filled thermoset organopolysiloxane top coat on the thermoset acrylic containing primer or intermediate layer. This primed and top coated sheet is hereafter referred to as sheet A.

A melamine based coating composition is prepared by mixing together 360 grams of R-380 produced and sold by Bee Chemical Company (an adhesive and leveling agent containing a melamine and a hydroxylized functionalized acrylate), 400 grams of 1,4-butanediol, 760 grams of hexabis(methoxy-methyl) melamine, 480 grams of Desmophen 1100, a hydroxyl terminated polyester sold by Mobay Chemical Co., 1.1 grams of p-toluenesulfonic acid, and 1500 ml of 2-butoxy ethanol. This mixture is stirred, at room temperature, until all of the solids are dissolved.

One side of a 500 mil thick polycarbonate sheet is primed with a thermosettable acrylic containing primer composition. The sheet coated with this primer composition is then baked at 125° C. for 30 minutes to effect the cure of the thermosettable acrylic to the thermoset state, thereby producing a polycarbonate sheet primed with a thermoset acrylic primer layer. The primed sheet is then coated with the melamine based coating composition described above and heated at about 125° C. for about 2 hours to cure the coating, thereby producing a primed polycarbonate sheet having a melamine based top coat on the thermoset acrylic containing primer or intermediate layer. This primed and coated sheet is hereafter referred to as sheet B.

One side of a 500 mil thick polycarbonate sheet is primed with a polymethyl methacrylate containing primer or intermediate layer. The primed sheet is then coated with the aforedescribed melamine coating composition and heated at about 125° C. for about 2 hours to cure the coating, thereby producing a primed polycarbonate sheet having a melamine based top coat on the thermoplastic acrylic containing primer or intermediate layer. This primed and coated sheet is hereafter referred to as sheet C.

One side of a 500 mil thick polycarbonate sheet is coated with the aforedescribed melamine coating composition and heated at about 125° C. for about 2 hours to cure the coating, thereby producing a melamine based coating on the unprimed polycarbonate sheet. This unprimed sheet having a melamine based coating thereon is hereafter referred to as sheet D.

EXAMPLE 1

This example illustrates a laminate falling outside the scope of the instant invention in that the exposed, back or inboard surface of the back polycarbonate ply, which is opposite the direction of impact or shock, does not contain an intermediate softer and less brittle layer between the polycarbonate and the hard and brittle mar-resistant top coat.

There was laminated in an autoclave using a standard edge bagging technique with a temperature of 142° C., a pressure of 100 psi, and a hold time of 20 minutes, a laminate consisting of a 500 mil thick uncoated and unprimed front or impact receiving polycarbonate sheet bonded by 34 mils of LR-3320 polysiloxane-polycarbonate block copolymer to polycarbonate sheet D described above, the latter having the melamine based coating on its back, exposed or inboard surface. When three "Medium Power" bullets from a 38 super automatic, forming a 3 shot triangular pattern with about 4 inches between shots, were fired at the front polycarbonate sheet in accordance with Underwriters Laboratory Standard for Bullet-Resisting Equipment, specifically UL 752 dated Feb. 23, 1973, at a temperature of 32° F., the exposed surface of sheet D spalled in a brittle manner, damaging cardboard indicators placed about 18 inches behind the test laminate.

The following Examples illustrate laminates falling within the scope of the instant invention in that the exposed, back or inboard surface of the back polycarbonate ply, which is opposite the direction of impact or shock, contains an intermediate softer and less brittle layer between the polycarbonate and the hard and brittle mar-resistant top coat.

EXAMPLE 2

There was laminated in an autoclave using a standard edge bagging technique with a temperature of 142° C., a pressure of 100 psi, and a hold time of 20 minutes, a laminate consisting of a 500 mil thick uncoated and unprimed front or impact-receiving polycarbonate sheet bonded by 34 mils of LR-3320 polysiloxane-polycarbonate block copolymer to polycarbonate sheet C described above, the latter having a polymethyl methacrylate containing primer layer and a melamine based top coat on its back, exposed or inboard surface. When three "Medium Power" bullets from a 38 super automatic, forming a three shot triangular pattern with about 4 inches between shots, were fired at the front polycarbonate sheet in accordance with Underwriters Laboratory Standard for Bullet-Resisting Equipment, specifically UL 752 dated Feb. 23, 1973, at a temperature of 32° F., there was no penetration or spalling of the back sheet C.

EXAMPLE 3

Example 2 was repeated except that the back polycarbonate sheet was sheet B described above which had a thermoset acrylic containing primer layer and a melamine based top coat on its back, exposed or inboard surface. When this laminate was tested as in Example 2, there was no penetration or spalling, even when the test was conducted with the laminate at a temperature of −25° F.

EXAMPLE 4

Example 2 was repeated except that the back polycarbonate sheet was sheet A described above which has a thermoset acrylic containing primer layer and a colloidal silica-filled organopolysiloxane top coat on its back, exposed or inboard surface. When this laminate was tested as in Example 2, there was no penetration or spalling, even when the test was conducted with the laminate at a temperature of −25° F.

Comparison of Example 1 with Examples 2–4 clearly shows that the presence of an intermediate softer and less brittle layer between the polycarbonate and the hard and brittle mar-resistant top coat overcomes any notch sensitivity tendency of polycarbonate layers when overlaid with relatively more brittle and harder material on the side opposite the impact receiving direction.

There are provided, then, by the present invention improved impact shock resistant laminates which overcome any notch sensitivity tendency of polycarbonate layers when overlaid with relatively more brittle material on the side opposite the impact receiving direction. The invention further make possible and practical laminates of the type described which are not only improved in impact resistance but are resistant to marring and scratching and similar abuse which detracts from clarity or transparency when such laminates are used as windshields, windows, view ports, glazing and the like. Heating elements or detection means such as wires, films, and the like well known to those skilled in the art can also be incorporated in the present structures.

What is claimed is:

1. In an improved impact or shock resistant laminate exhibiting improved resistance to spalling comprising a plurality of impact or shock receiving layers bonded together by a compatible adhesive and selected from, glasses and solid resinous materials selected from the group consisting of polycarbonate epoxies, polyurethanes, chlorinated aromatic ethers, polyether sulfones, acrylics, rubber modified acrylics, polyarylsulfones, polystyrenes, cellulose acetate butyrates, and polyesters, including a back polycarbonate lamina disposed opposite the direction of impact or shock, said back polycarbonate lamina having disposed on the exposed surface thereof opposite the direction of impact or shock a mar-resistant coating harder and more brittle than the underlying polycarbonate lamina; the improvement consisting of an intermediate layer which is relatively less brittle and softer than said mar-resistant coating disposed between said exposed surface of said back polycarbonate lamina and said mar-resistant coating.

2. The laminate of claim 1 wherein said intermediate layer is comprised of a thermoplastic acrylic polymer.

3. The laminate of claim 2 wherein said thermoplastic acrylic polymer is polymethyl methacrylate.

4. The laminate of claim 2 wherein said mar-resistant coating is a melamine based coating.

5. The laminate of claim 2 wherein said mar-resistant coating is comprised of a thermoset organopolysiloxane.

6. The laminate of claim 2 wherein said mar-resistant coating is comprised of a colloidal silica-filled thermoset organopolysiloxane.

7. The laminate of claim 1 wherein said intermediate layer is comprised of a thermoset acrylic.

8. The laminate of claim 7 wherein said mar-resistant coating is a melamine based coating.

9. The laminate of claim 7 wherein said mar-resistant coating is comprised of a thermoset organopolysiloxane.

10. The laminate of claim 7 wherein said mar-resistant coating is comprised of a colloidal silica-filled thermoset organopolysiloxane.

11. The laminate of claim 1 wherein said mar-resistant coating is a melamine based coating.

12. The laminate of claim 1 wherein said mar-resistant coating is comprised of a thermoset organopolysiloxane.

13. The laminate of claim 1 wherein said mar-resistant coating is comprised of a colloidal silica-filled thermoset organopolysiloxane.

14. The laminate of claim 1 wherein said solid resinous material is polycarbonate.

15. The laminate of claim 1 wherein said solid resinous material is acrylic.

16. The laminate of claim 1 wherein said compatible adhesive is a polysiloxane-polycarbonate copolymer prepared by reacting (a) a halogen chain-stopped polydiorganosiloxane composed of from about 5 to 200 chemically combined diorganosiloxy units consisting essentially of dialkylsiloxy units which are connected to each other by silicon-oxygen-silicon linkages wherein each of the silicon atoms has two organo radicals attached through a carbon-silicon bond, and (b) a dihydric phenol having the formula

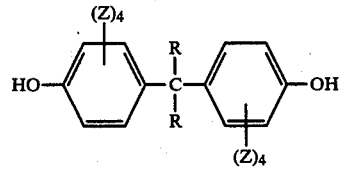

where Z is a member selected from the class consisting of hydrogen, lower alkyl radicals and halogen radicals and combinations thereof, and R is a member selected from the class consisting of hydrogen, hydrocarbon and halogenated radicals, and phosphenating the purified reaction product.

* * * * *